United States Patent Office 3,525,727
Patented Aug. 25, 1970

3,525,727
PROCESS AND CATALYST SYSTEM FOR THE LOW-TEMPERATURE POLYMERIZATION OF VINYL MONOMERS CONTAINING VINYL CHLORIDE
Carlo Nicora, Varese, Giancarlo Borsini, Milan, Giovanni Confalonieri, Monza, and Guidobaldo Cevidalli, Seveso, Italy, assignors to Montecatini Edison S.p.A., Milan, Italy, a corporation of Italy
No Drawing. Filed Feb. 8, 1967, Ser. No. 614,535
Claims priority, application Italy, Feb. 10, 1966, 2,912/66
Int. Cl. C08f 1/62, 3/30
U.S. Cl. 260—92.8          12 Claims

ABSTRACT OF THE DISCLOSURE

A process and catalyst system for the low-temperature (0° C. to —100° C.) polymerization of vinylic monomer components containing at least 75% by weight of vinyl chloride (i.e. vinyl chloride alone or in combination with up to 25% by weight of vinyl monomers copolymerizable with vinyl chloride) whereby the reaction is carried out in the presence of a multicomponent catalyst system constituted by:

(a) A triorgano boron compound of the general formula $BR_3$, coordinated with ammonia or a substituted ammonia of the general formula

where R represents an alkyl radical with a straight or branched chain containing from 1 to 6 carbon atoms, a cyclo-aliphatic radical containing from 3 to 8 carbon atoms, an aryl radical, or an aralkyl radical containing between 1 and 6 carbon atoms in the alkyl chain attached to the benzene nucleus; R' and R" are the same or different members from the group of hydrogen atoms, hydrocarbon radicals of straight or branched chain and a carbon number of 1 to 6, and respective bonds of a heterocyclic nitrogen compound; and R''' is a member of the group consisting of hydrogen, aliphatic hydrocarbon radicals of straight or branched chain and a carbon number of 1 to 6, an aryl radical (phenyl or substituted phenyl), or an aralkyl radical containing an alkyl group attached to the benzene nucleus and having from 1 to 6 carbon atoms; and (b) A tetravalent cerium salt (or double salt with ammonium) of an inorganic acid, (e.g. sulfuric acid, nitric acid, pyrophosphoric acid and perchloric acid).

Our present invention relates to a process for the polymerization of a vinylic monomer component consisting at least in major part of vinyl chloride to obtain polymeric materials of high stereoregularity and good crystallinity.

It has already been proposed to carry out a low-temperature polymerization of vinylic compounds including vinyl chloride, in the presence of redox (reduction-oxidation) catalyst systems to obtain more or less crystalline polymers having good stereoregularity. In such processes, which have only infrequently been effective at temperatures below 0° C., the redox catalyst system is constituted by a two-component combination of a substance with reducing characteristics and a substance capable of oxidizing the former. These systems are effective because they are capable of supplying the activation energy necessary for the initiation of a free-radical polymerization reaction at such low temperatures. However, good stereoregularity requires temperatures well below the temperatures of +20° C. or the like at which these reactions are most commonly carried out, because of the rapid decline in reaction rate with temperature lowering. Thus, when temperatures of 0° C. and below are contemplated, conventional redox catalyst systems have been avoided because the reaction rate is so slow as to be impractical either on a commercial or a pilot scale.

It is, therefore, the principal object of the present invention to provide an improved process for the production of vinyl-chloride polymers (i.e. homo- or copolymers containing a predominance of chemically combined vinyl chloride) whereby the product has high stereoregularity. (e.g. as measured by the syndiotactic index IS) and good crystallinity, while having a reaction rate satisfactory on a commercial scale.

A further object of this invention is to provide a low-temperature polymerization process which, in spite of the relatively low temperatures involved, is characterized by commercially effective reaction or polymerization rates.

Another object of our invention is to provide a highly economically and easily handled catalyst system for the low-temperature polymerization of monomeric components consisting largely of vinyl chloride.

Another object of our invention is to provide an improved redox catalyst system for the homopolymerization and copolymerization of vinyl chloride whereby disadvantages hitherto characterizing such systems are avoided and highly stereoregular polymers can be obtained at appreciable polymerization rates.

We have surprisingly discovered that an oxidizing cerium salt, namely, a tetravalent-cerium salt (or double salt) of an inorganic acid of the type described in commonly assigned copending application Ser. No. 444,811 (filed Apr. 1, 1965, by two of the present joint applicants), when combined with a coordinated triorgano boron/ammonia or substituted ammonia component of the general formula

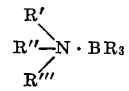

gives rise to a catalyst system effective even at very low polymerization temperatures (e.g. —40° C. and below) to effect vinyl chloride polymerization to polymers with high stereoregularity and excellent yield and conversion rates beyond any which could be approached by either catalyst component alone and without disadvantages arising from the use of earlier catalysts containing trialkyl borons for example. The totally unexpected synergistic results are particularly noticeable at the low temperatures indicated and especially at polymerization temperatures less than —20° C.

While we have represented the coordination compound of the triorgano boron component with the ammonia or substituted-ammonia component by a dot formula, it will be understod that this representation is merely for convenience. In general, however, equimolecular amounts of triorgano boron ($BR_3$) and the ammonia or substituted-ammonia component

are employed in the reducing part of the redox system whose oxidizing part is a tetravalent-cerium salt.

The coordinated reducing component, according to this invention, is composed of:

(a) A triorgano boron compound of the formula $BR_3$, where R represents an alkyl radical with straight or branched chain and having 1 to 6 carbon atoms (preferably 1 to 4), a cyclo- aliphatic radical containing up to 8 carbon atoms (i.e. having a saturated ring with 3 to 8 carbon atoms), an aryl radical (i.e. phenyl or a substituted phenyl), or an aryl-alkyl radical whose alkyl chain, attached to a benzene ring, is straight or branched with 1 to 6 carbon atoms (preferably benzyl); and (b) Ammonia or a substituted ammonia having the formula

where R' and R" are the same or different members of the group of hydrogen atoms, hydrocarbon radicals with straight or branched chains having 1 to 6 carbon atoms, and respective bonds of a heterocyclic nitrogen compound (e.g. pyridine), and R''' is a member of the group consisting of a hydrogen atom, aliphatic hydrocarbon radicals of straight or branched chain with a carbon number of 1 to 6, an aryl radical (preferably phenyl) or an aryl-alkyl radical containing an alkyl group attached to the benzene nucleus and having 1 to 6 carbon atoms (preferably a benzyl radical).

Tetravalent cerium compounds of the present invention may be a salt (or ammonium double salt) of an inorganic acid as described in the aforementioned copending application, especially the stronger inorganic acids such as sulfuric acid, nitric acid, pyrophosphoric acid and perchloric acid.

The coordinated component

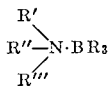

has a surprisingly high stability, especially when the ammonia or substituted ammonia and the triorgano-boron compound are present in a 1:1 molar ratio, by comparison with the corresponding trialkyl boron for example. Thus, this catalyst system is chemically stable and not autocombustible, whereas the corresponding trialkyl boron is autocombustible and tends to undergo self-ignition or high-rate oxidation under normal handling operations. The catalyst system of the present invention, therefore, can be used without particular precautions to avoid auto-ignition. Furthermore, the redox catalyst system of this invention is characterized by a surprisingly high activity at the lower operating temperature by comparison to earlier free-radical polymerisation catalysts based upon coordinating boron compounds with nitrogen containing substances such as for example the following systems that in these conditions $B(C_2H_5)_3 \cdot NH_3$
$B(C_2H_5)_3 \cdot N(C_2H_5)_3$
$B(C_2H_5)_3 \cdot NH_3 +$ oxygen or air
$B(C_2H_5)_3 \cdot N(C_2H_5)_3 +$ oxygen or air
$B(C_2H_5)_3 \cdot NH_3 +$ inorganic oxidizers such as NaClO and KMnO$_4$.

are completely inactive or they give rise to industrially unacceptable polymerization rates or finally they lead to polymeric materials endowed with characteristics for which these polymers cannot be industrially used.

The triorgano-boron compound of the coordinated component is preferably selected from the group which consists of trimethyl boron, triethyl boron, tripropyl boron (normal or iso), tributyl boron (normal or iso), trihexyl boron, tricyclohexyl boron, dimethylcyclohexyl boron, tribenzyl boron and triphenyl boron.

The ammonia and substituted ammonia-type componnds to be coordinated with the triorgano boron are preferably from the group of ammonia, primary, secondary and tertiary amines and heterocyclic compounds in which two bonds of the ring form nitrogen bonds represented as R' and R" in the formula

Most desirable have proved to be ammonia, dimethylamine, diethylamine, monomethylamine, monoethylamine, trimethylamine, triethylamine, pyridine and alkyl pyridines.

Most advantageous of the tetravalent cerium salts employed in accordance with the present invention are ceric nitrate, ceric sulfate, ceric ammonium nitrate, ceric ammonium sulfate, ceric pyrophosphate, ceric perchlorate.

According to a further feature of our invention, the polymerization is carried out in the presence of an excess of a basic substance, e.g. ammonia, ammonium hydroxide, aliphatic amines, sodium hydroxide or potassium hydroxide when the catalyst system is relatively basic, e.g. $B(C_2H_5)_3 \cdot NH_3/Ce(NH_4)_2(NO_3)_6$ or in the presence of excess acid (e.g. sulfuric acid or nitric acid) when the catalyst system is more or less basic, $$B(C_2H_5)_3 \cdot NH_3/Ce(SO_4)_2 \cdot 4H_2O$$

The pH-modifying substance should be present in a molar ratio with the cerium salt in an amount between 0 and 100 although amounts between 0 and 10 are more commonly desirable.

The monomer component, according to this invention, should consist of at least 75% by weight of vinyl chloride, the balance—up to 25% by weight—being constituted by monomers capable of copolymerization with vinyl chloride. Monomers capable of such copolymerization include vinyl acetate, vinylidene chloride, and acrylonitrile or monomers containing an acrylonitrile group.

The polymerization process, according to the invention, is carried out, at temperatures of 0° C. to —100° C. and preferably below —20° C., in the presence of a solvent capable of maintaining in solution the active species of the catalyst system, i.e. the coordinating compound of the triorgano boron and the tetravalent cerium compound. Particularly suitable for this purpose are the aliphatic alcohols, ketones, cyclic ethers, simple or substituted amines, nitriles and mixtures of these solvents with water in ratios compatible with the temperature and with their miscibility with the monomer or with the mixtures of monomers forming the monomeric component.

The polymerization process according to the present invention is generally carried out by using a catalytic system constituted by the coordinate compound of the boron derivative and of the tetravalent ceric compound in quantities ranging between 0.0001 and 0.5 and preferably between 0.001 and 0.05 part by weight expressed as as metallic boron) and between 0.001 and 1 and preferably between 0.01 and 0.4 part by weight (expressed as metallic cerium) with respect to 100 parts by weight of vinyl chloride or of the mixtures of monomers containing vinyl chloride.

According to a preferred embodiment of the present invention, anhydrous vinyl chloride is combined with the catalytic system by adding separately the two components, that is, the coordinate compound of the triorgano boron derivative and the tetravalent cerium derivative, the latter dissolved in a suitable solvent, (e.g. methanol). The homogeneous mixture is kept under constant stirring at the polymerization temperature, generally lower than 0° C., and preferably below —15° C. for the duration of the reaction. In order to avoid any undesirable postpolymerization, which might give rise to a polymer having undesired characteristics, polymerization is stopped by making use of a hydroperoxidic stopping agent such as H$_2$O$_2$, cumene hydroperoxide as described in the commonly assigned copending application Ser. No. 527,745 of Feb. 16, 1966 (which is a continuation-in-part of Ser.

No. 444,811 and has since issued as U.S. Pat. No. 3,390,143). The polymer in recovered by filtration, washed with dilute acid and then with alcohol to neutrality and dried under vacuum at temperatures of about 50° C. The polymers and copolymers of vinyl chloride, have a high degree of crystallinity, with scyndiotactic indexes varying between 2 and 2.8 (of course in relation to the polymerization temperature).

The stereotactic index IS is a measure of the stereoregularity of vinyl-chloride polymers and is determined as indicated in Chimica e l'Industria, volume 46, pp. 166–171, 1964, by measurement of the infrared spectrum of the polymer itself; in the polyvinyl chloride infrared spectrum the stereoregularity in the macromolecular chain produces its strongest effects in the region from 600 to 700 cm.$^{-1}$ where there are two bands of particular significance at 635 cm.$^{-1}$ and 692 cm.$^{-1}$. For this reason, the ratio of absorption intensities $I(635$ cm.$^{-1})/I692$ cm.$^{-1})$ of these bands is indicated as IS (syndiotactic index) and is taken as an indication of the relative amount of the syndiotactic fraction of the polymer. The measurements are experimentally obtained by dissolving the polymer in cyclohexanone at about 120° C. for 15 min. to yield a solution of 0.8 to 1% by weight of polymer. The solution is quickly cooled and evaporated at about 50° C. under a reduced pressure of 10 mm. Hg on a flat glass surface. Films are obtained having a thickness of about 20–30 and are subjected to I-R analysis in a Perkin-Elmer spectrophotometer (Mod. 21) at double radius with a potassium-bromide prism.

The molecular weights of the polymers are determined by the method explained in Chimica e l'Industria, volume 36, pp. 883–889, 1954, from the intrinsic viscosity of a solution of the polymer. Thus the intrinsic viscosity is measured at 25° C. for solutions of the polymer in cyclohexanone at a concentration of 0.1% by weight. The equation which relates the molecular weight of the polymer to its intrinsic viscosity is the following: $\eta = 2.4 \times 10^{-4} \overline{Mn}^{0.77}$ wherein $\eta$ is the intrinsic viscosity in dl/gr and $\overline{Mn}$ is the numerical average molecular weight.

The molecular weight was found to range between 20,000 and 200,000 and the polymer was found to be perfectly white. The polymers were excellent for use in fibers and films, were resistant to attack by boiling water and chlorinated solvents which were capable of swelling conventional polyvinyl chlorides.

The following specific examples illustrate the principles of the present invention:

EXAMPLE I

A one-liter flask, provided with a stirrer and with a thermometer, was carefully flushed with high-purity nitrogen repeatedly to displace all air therefrom. 420 grams of vinyl chloride and 1.79 grams of $(NH_4)_2Ce(NO_3)_6$, dissolved in 64 grams of methanol were then introduced into the flask. The temperature of the flask was strictly kept constant at $-40°$ C.

0.36 gram of the coordinated compound $$B(C_2H_5)_3 \cdot NH_3$$

containing dissolved therein 0.02 gram of free $NH_3$, were also introduced; the resulting reaction mixture was held at the reaction temperature of $-40°$ C. for two hours with continuous stirring. At this point polymerization was stopped by the addition of 5 cc. of $HNO_3$ diluted with 15 cc. of $CH_3OH$ and, immediately thereafter, by the addition of 2 cc. of $H_2O_2$ of 35% titer dissolved in 10 cc. of $CH_3OH$. The stopped reaction mixture was then filtered; the solid product was washed first with acidified methanol and then with water.

The polymer recovered from the mixture was dried and weighed (21.4 grams), the conversion being 5.1% based on the monomer used. The polymer was characterized by an intrinsic viscosity in cyclohexanone at 25° C. of 1.37, by a molecular weight of 75,000 and by a syndiotactic index of 2.4.

EXAMPLE II

Several flushing operations with nitrogen were made of a glass flask, thereby carefully replacing all air with nitrogen; 10 grams of vinyl chloride were then condensed into the flask at $-78°$ C.

1.3 grams of a methanol solution of $(NH_4)_2Ce(NO_3)_6$ containing 0.038 gram of the salt and, subsequently, 0.016 gram of $B(C_2H_5)_3 \cdot NH_3$ containing 6% by weight of free $NH_3$ were then introduced.

The flask was sealed by a flame, brought to a temperature of $-40°$ C. and continuously shaken for 4 hours.

The polymerization reaction was then terminated by dipping the flask into liquid air. The reaction mixture was filtered and the filtrate washed with acidified methanol containing 2% by weight of $H_2O_2$ (35% titer); after drying the polymer was found to weigh 0.9 gram calculated at a conversion of 9% (based on monomer used). The polymer was characterized by a molecular weight of 105,000 and by a syndiotactic index of 2.4.

EXAMPLE IIa

In a test similar to Example II but carried out without the cerium salt but operating in the presence of oxygen acting as an oxidizer in conjunction with the triethyl boron, no trace of polymer was obtained after 7 hours of reaction at $-40°$ C.

EXAMPLE III 100 grams of vinyl chloride was charged at $-78°$ C. into a 250 cc. flask provided with a stirrer and a thermometer. Subsequently a solution of 0.37 gram of $$Ce(SO_4)_2 \cdot 4H_2O$$

and 3.18 grams of sulfuric acid was introduced into 25 grams of methanol therein, previously cooled to $-40°$ C. and then 97 mgm. of $B(C_2H_5)_3 \cdot NH_3$ was added.

The mixture was kept under stirring at $-40°$ C. for two hours, thereafter the polymerization was stopped by adding an excess of hydrogen peroxide/methanol solution.

The polymerization mixture was filtered, the precipitate washed with methanol, acidified with sulfuric acid, and then dried. The polymer thus obtained weighed 5.54 grams, corresponding to a conversion of 5.54%, based upon the initial quantity of monomer.

EXAMPLE IIIa

In a test carried out with the same procedure and materials as in Example III, but substituting for the cerium salt, an equimolecular quantity of cumene hydroperoxide, a conversion of 0.1% was obtained within the same reaction time.

EXAMPLE IV

Into a Pyrex glass flask, after having replaced the air thereof with nitrogen, 1.5 grams of $CH_3OH$, 0.04 gram of $(NH_4)_2Ce(NO_3)_6$ and 10 grams of vinyl chloride, in which 0.015 cc. of the addition compound $$B(C_2H_5)_3 \cdot NH(C_2H_5)_2$$

was previously dissolved, were charged at $-78°$ C. and under nitrogen. The flask was brought to a temperature of $-40°$ C. and kept under stirring for 2 hours. At the end of the test, the polymer was separated from the polymerization mass by filtration and washing with methanol, acidified with sulfuric acid.

After drying, 0.61 gram of polymer was obtained, corresponding to a conversion of 6.1%, based on initial monomer.

EXAMPLE IVa

In a test substantially identical to that of Example IV, but where the cerium salt had been replaced by an equimolecular quantity of cumene hydroperoxide, after 2 hours of polymerization at −40° C., only 0.026 gram of polymer was obtained, corresponding to a conversion of 0.26%.

EXAMPLE V

Into a 2-liter flask, after having completely replaced ambient air by nitrogen free from oxygen, 1000 grams of vinyl chloride were condensed at a temperature of −40° C. A solution of 4.2 grams of $(NH_4)_2Ce(NO_3)_6$ and of 0.15 gram of NaOH in 150 grams of $CH_3OH$, previously cooled to a temperature of −40° C., was charged into the reaction flask.

Polymerization was initiated by adding 0.9 gram of $B(C_2H_5)_3 \cdot NH_3$. The mixture was constantly stirred for one hour at −40° C.; thereupon the reaction was "stopped" by adding nitric acid and then hydrogen peroxide, both dissolved in methanol. The reaction mass was filtered and the precipitate washed and dried; after which 23 grams of polymer were obtained corresponding to a conversion of 2.3%, based on initial monomer.

EXAMPLE VI

The polymerization vessel was a 250-cc. flask, carefully flushed with nitrogen to displace all ambient air therewith. 106 grams of vinyl-chloride monomer were introduced into the vessel at a temperature of −40° C., followed by a solution of 15 grams of methanol containing 0.44 gram of $Ce(NH_4)_2(NO_3)_6$ and 0.03 gram of NaOH.

Polymerization was initiated by adding 0.13 gram of the coordination compound borontriethyl·pyridine,

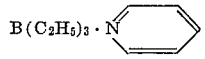

After 2 hours of polymerization at −40° C. the reaction was stopped by adding methanol acidified with $HNO_3$ and subsequently treating the reaction mixture with a methanol solution of hydrogen peroxide.

The reaction mixture was filtered and washed with methanol. The dried product weighed 3.4 grams with a conversion of 3.2%, based on the monomer.

EXAMPLE VII

The reaction vessel was prepared by careful rinsing with nitrogen to displace all traces of oxygen; 200 grams of vinyl chloride at a temperature of −40° C. and 30 grams of $CH_3OH$, containing 0.84 gram of dissolved $(NH_4)_2Ce(NO_3)_6$, were then charged into the 500-cc. flask. The polymerization was initiated by adding 0.18 gram of the coordination compound $B(C_2H_5)_3 \cdot NH_3$.

After reaction for one hour at a temperature of −40° C. the polymerization was stopped by adding an excess of a methanol solution of $NHO_3$ and then a solution of 0.5 cc. of $H_2O_2$ at 35% titer in 10 cc. of methanol. The reaction mixture was filtered and the filtrate washed with acidified methanol and then dried.

The product thus obtained weighted 4.4 grams, equivalent to a conversion of 2.2% based on monomer input.

EXAMPLE VIII

A stainless-steel autoclave, provided with stirrer and thermometer, was prepared by carefully substituting nitrogen, during several rinses, for the ambient air.

1500 grams of vinyl chloride, 225 grams of $CH_3OH$ containing 6 grams of dissolved $(NH_4)_2Ce(NO_3)_6$ were introduced, in order, while the temperature was held at −78° C. The mixture was then brought to a temperature of −40° C. and polymerization initiated by adding 2.25 cc. of the coordinating compound $B(C_2H_5)_3 \cdot NH(C_2H_5)_2$.

The mixture was held at this temperature (−40° C.) with continuous stirring for a period of 5 hours. At the end of this period the polymer was separated from the polymerization mass by filtration with methanol acidified with sulfuric acid. After drying, 210 grams of polymer were obtained, corresponding to a conversion of 14%.

EXAMPLE VIIIa

In a test similar in all respects to Example VIII, but where the cerium salt had been replaced with an equimolecular quantity of cumene hydroperoxide, after 2 hours of polymerization at a temperature of −40° C., only 4.5 grams of polymer were obtained with a conversion of 0.3%.

EXAMPLE IX

A 250-cc. flask was carefully freed from air by displacement with nitrogen; then, after cooling to a temperature of −78° C., 100 grams of vinyl chloride were loaded. 10 grams of methanol solution containing 0.32 grams of $Ce(ClO_4)_4$ were then introduced.

The mixture was brought to a temperature of −40° C. and then 0.13 gram of the addition compound $B(C_4H_9)_3 \cdot NH_3$ was added and the mixture was kept under stirring for 3 hours. The polymerization was stopped by treating the reaction mixture with an acidified solution of $H_2O_2$ in $CH_3OH$. The reaction mixture was filtered and the filtrate washed as previously described; the polymer weighed 8 grams with a conversion of 8%, based on the monomer.

In each of Examples III, IV, V, VI, VII, VIII and IX, the polymers obtained has a relatively high syndiotactic index (between 2 and 2.8), and a molecular weight, as determined by intrinsic viscosity as described above, of 20,000 to 200,000. With each of trialkyl boron/ammonia or substituted-ammonia coordination or addition compounds of these examples and Examples I and II, it was observed that the best results were obtained when the boron compound was present in an amount ranging between 0.0001 and 0.5 part by weight (calculated or determined as elemental boron) per 100 parts by weight of the monomeric component. The cerium compound was effective when present in an amount between 0.001 and 1 part by weight (calculated or determined as elemental cerium) per 100 parts by weight of the monomeric component. Under the conditions of these examples, substantially equivalent results were obtained when equivalent quantities of cerium nitrate, cerium sulfate, cerium ammonium sulfate, cerium ammonium nitrate, cerium ammonium pyrophosphate and cerium perchlorate were used. Tests equivalent to those of Examples I–IV also revealed that the monomeric component can include 75% by weight of vinyl chloride and up to 25% by weight of vinylic monomers copolymerizable with vinyl chloride. Among the comonomers found to be effective were vinylidene chloride, vinyl acetate, and monomers containing an acrylonitrile group.

We claim:

1. A process for producing polymers having a high degree of crystallinity and high stereoregularity, comprising the step of polymerizing a monomeric component consisting predominantly of vinyl chloride at a temperature between 0° C. and −100° C. in the presence of a catalyst system constituted by:

(a) a coordination compound of a triorgano boron having the general Formula $BR_3$, and an ammonia or substituted ammonia having the general Formula

wherein R represents an alkyl radical with a straight or branched chain containing from 1 to 6 carbon atoms, a cyclo-aliphatic radical containing from 3 to 8 carbon atoms, an aryl radical, or an aralkyl radical containing between 1 and 6 carbon atoms in the alkyl chain attached to the benzene nucleus, wherein R' and R" are the same or different members from the group of hydrogen atoms, hydrocarbon radicals of straight or branched chain with a carbon number of 1 to 6, and respective bonds of a heterocyclic nitrogen compound, and wherein R''' is a member of the group consisting of a hydrogen atom, aliphatic hydrocarbon radicals of straight or branched chain with a carbon number of 1 to 6, an aryl radical or an aralkyl radical containing an alkyl group attached to the benzene nucleus and having from 1 to 6 carbon atoms; and (b) a tetravalent cerium salt.

2. The process defined in claim 1 wherein said monomeric component consists of at least 75% by weight vinyl chloride.

3. The process defined in claim 2 wherein said monomeric component contains up to 25% by weight of a polymerizable vinylic compound copolymerizable with vinyl chloride.

4. The process defined in claim 1 wherein said coordination compound is a coordination product of a trialkyl boron having alkyl groups of 1 to 4 carbon atoms, with ammonia or a primary, secondary, tertiary or heterocyclic amine.

5. The process defined in claim 4 wherein said amine is selected from the group which consists of monomethylamine, monoethylamine, dimethylamine, diethylamine, trimethylamine, triethylamine, pyridine and alkyl derivatives thereof.

6. The process defined in claim 1 wherein said tetravalent cerium salt is a simple salt or an ammonium double salt of an inorganic acid.

7. The process defined in claim 6 wherein said inorganic acid is selected from the group which consists of sulfuric acid, nitric acid, pyrophosphoric acid and perchloric acid.

8. The process defined in claim 1 wherein said coordination compound and that ceric salt are present in said system in amounts equivalent to substantially 0.001 and 0.5 part by weight boron and 0.001 and 1 part by weight cerium per 100 parts by weight of said monomeric component.

9. The process defined in claim 1 wherein the polymerization is carried out at a temperature below substantially $-20°$ C.

10. The process defined in claim 1 further comprising the step of terminating the polymerization reaction by adding to the reaction system an acidified solution of at least one peroxide compound.

11. A polymerization catalyst system consisting essentially of:

a coordination compound of a triorgano boron having the general formula $BR_3$ and an ammonia or substituted ammonia having the general formula

wherein R represents an alkyl radical with a straight or branched chain containing from 1 to 6 carbon atoms, a cyclo-aliphatic radical containing from 3 to 8 carbon atoms, an aryl radical, or an aralkyl radical containing between 1 and 6 carbon atoms in the alkyl chain attached to the benzene nucleus, wherein R' and R'' are the same or different members from the group of hydrogen atoms, hydrocarbon radicals of straight or branched chain and a carbon number of 1 to 6, and respective bonds of a heterocyclic nitrogen compound, and wherein R''' is a member of the group consisting of a hydrogen atom, aliphatic hydrocarbon radicals of straight or branched chain and a carbon number of 1 to 6, an aryl radical or an aralkyl radical containing an alkyl group attached to the benzene nucleus and having from 1 to 6 carbon atoms; and a tetravalent cerium salt.

12. A catalyst system as defined in claim 11 wherein said coordination compound is a coordination product of a trialkyl boron having alkyl groups of 1 to 4 carbon atoms, with ammonia or a primary, secondary, tertiary or heterocyclic amine; and wherein said tetravalent cerium salt is a simple salt or an ammonium double salt of an inorganic acid selected from the group which consists of sulfuric acid, nitric acid, pyrophosphoric acid and perchloric acid.

References Cited

UNITED STATES PATENTS

| 2,922,775 | 1/1960 | Mino | 260—92.8 |
| 3,275,611 | 9/1966 | MoHus, et al. | 260—92.8 |
| 3,390,143 | 6/1968 | Nicora et al. | 260—92.8 |

FOREIGN PATENTS

| 1,268,602 | 6/1961 | France. |
| 1,287,583 | 2/1962 | France. |

OTHER REFERENCES

Fordham, J.W.L., et al.: Stereoregulated Polymerization in the Free Propagation Species, III, Effect of Temperature on the Polymerization of Vinyl Chloride, In Journal of Polymer Science, vol. XLI, pp. 73–82 (1959).

Furukawa, J., et al.: Catalytic Reactivity of Organometallic Compounds for Olefin Polymerization, II, Vinyl Chloride Polymerization Catalyzed by Binary Systems Involving Organometallic Compounds, In Journal of Polymer Science, vol. XL, pp. 237–246 (1959).

JOSEPH L. SCHOFER, Primary Examiner

J. A. DONAHUE, Jr., Assistant Examiner

U.S. Cl. X.R.

252—428; 260—85.5, 87.1, 87.7